Dec. 17, 1968    G. C. DI PIAZZA    3,417,351
DIGITALLY TUNED MICROWAVE FILTER
Filed Oct. 27, 1964    3 Sheets-Sheet 1
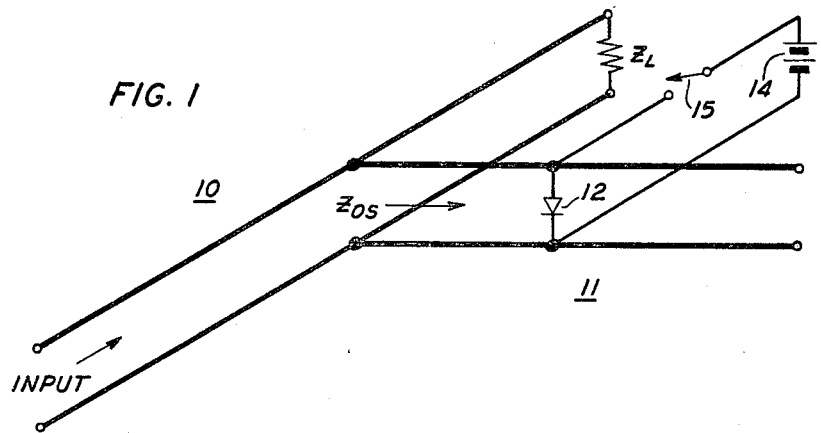
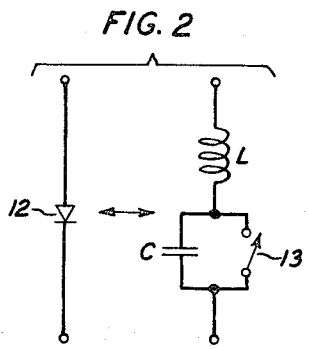
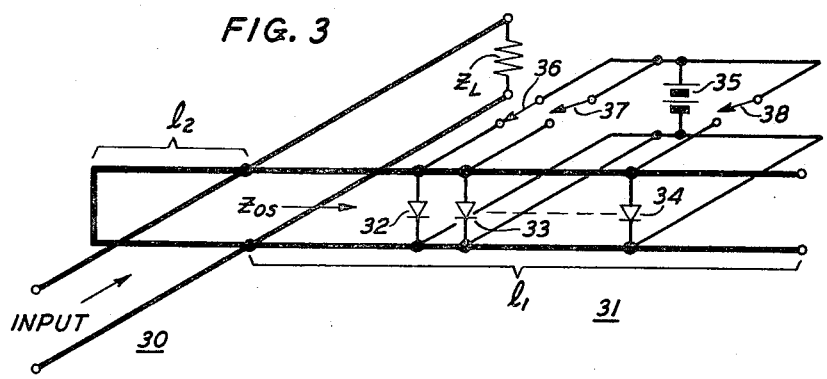
INVENTOR
G. C. DI PIAZZA
BY
ATTORNEY Dec. 17, 1968 G. C. DI PIAZZA 3,417,351
DIGITALLY TUNED MICROWAVE FILTER
Filed Oct. 27, 1964 3 Sheets-Sheet 3
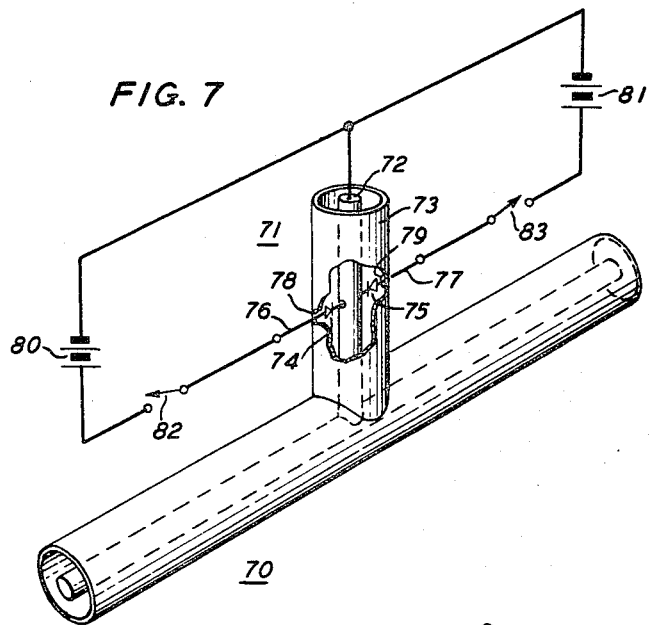
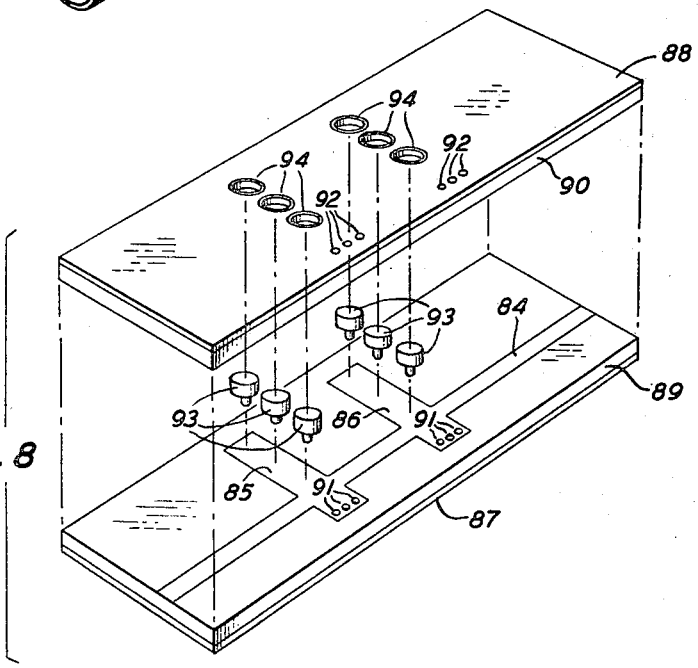

United States Patent Office 3,417,351
Patented Dec. 17, 1968

3,417,351
DIGITALLY TUNED MICROWAVE FILTER
Gerald C. di Piazza, Dover, N.J., assignor to Bell Telephone Laboratories, Incorporated, New York, N.Y., a corporation of New York
Filed Oct. 27, 1964, Ser. No. 406,739
5 Claims. (Cl. 333—73)

ABSTRACT OF THE DISCLOSURE

This application describes tunable band-reject and band-pass filters.

A tunable band-reject filter in accordance with the invention comprises an open-circuited stub across which there are connected one or more switching elements for selectively changing the electrical length of the stub.

A tunable band-pass filter is realized by the addition of a short-circuited stub across the open-circuited stub. Switching means can be included in either or both stubs.

---

This invention relates to microwave filters and more specifically to microwave filters which are electrically tunable over a wide range of frequencies.

Tunable microwave filters have heretofore been provided in which the tuning has been accomplished by mechanically adjusting the physical length of certain filter elements or by otherwise changing the physical geometry of the filter. Although such filters are adequate for many applications, there are many other applications for which mechanically-tuned filters are hopelessly inadequate. For example, where the speed of adjustment is an important factor, mechanically-tuned filters tend to be too slow.

It is an object of the present invention to tune a microwave filter to any one of a plurality of resonant frequencies in the order of a microsecond or less.

Recently, electrically-tuned filters operating on an "analog tuning" principle have been provided which have partially overcome the disadvantages of mechanically-tuned filters. One such device utilizes a magnetically-biased ferrite element disposed in the path of the propagating wave energy within a hollow waveguide. Such a structure is disclosed in U.S. Patent No. 3,001,154, granted to F. Reggia on Sept. 19, 1961. While representing an improvement over the older mechanically-tuned filters, these devices still may not be desirable in applications requiring precise frequency selection. This is due to the fact that the resonant frequency of the filter varies continuously with variations in the magnitude of the externally applied biasing field. Therefore, if precise frequencies are desired it is obvious that the magnitude of the biasing field must be controlled very carefully.

Another analog-type filter structure is described in U.S. Patent No. 3,108,239, granted to M. N. Koueiter on Oct. 22, 1963. This filter structure is in the form of a resonant coaxial cavity, the physical length of which can be changed for "coarse" frequency adjustments. A varactor diode disposed within the cavity and connected in series with the center conductor is utilized for "fine" adjustment. The tuning of this device is, however, dependent upon an accurately measured biasing voltage applied to the diode. Therefore, such a device has both the disadvantages of slowness of tuning associated with mechanically-tuned filters and the high degree of biasing accuracy required of analog-type electrically-tuned filters.

It is, therefore, another object of the present invention to tune a microwave filter to any one of a plurality of preselected frequencies by the selective application of bi-level control signals.

In accordance with the teachings of the present invention, the above objects are accomplished by varying the electrical length of a section of transmission line in discrete steps through the use of selectively-biased, nonlinear reactance devices. In a basic embodiment of this invention, the electrical length of a stub in a stub-type filter is varied by means of a nonlinear reactance device shunted across the stub at a selected distance from the end of the stub. Due to the parasitic capacitance and inductance of the nonlinear reactance device, the equivalent of a lumped capacitive susceptance or inductive susceptance is added to the stub susceptance, depending upon the characteristics of the nonlinear reactance device and the conductance state to which it is biased.

By selecting the characteristic impedance of the stub and the position and characteristics of the nonlinear reactance devices, the stub and, hence, the filter can be tuned to a wide range of discrete, resonant frequencies. In general, the number of discrete frequencies to which the filter can be tuned is equal to two, raised to the power of the number of nonlinear reactance devices utilized.

The foregoing and other objects and features of the present invention can be more readily understood with reference to the following detailed description taken in conjunction with the accompanying drawings in which:

FIG. 1 is a schematic representation of one embodiment of the present invention;

FIG. 2 is a schematic diagram of a nonlinear reactance device utilized in the various illustrative embodiments of the present invention and the equivalent circuit for such device;

FIG. 3 is a schematic representation of another embodiment of the present invention;

FIG. 7 is a pictorial view, partially broken away, of another embodiment of the present invention utilizing coaxial transmission line elements; and FIG. 8 is an exploded pictorial view of yet another embodiment of the present invention utilizing strip transmission line elements.

Figure 4:
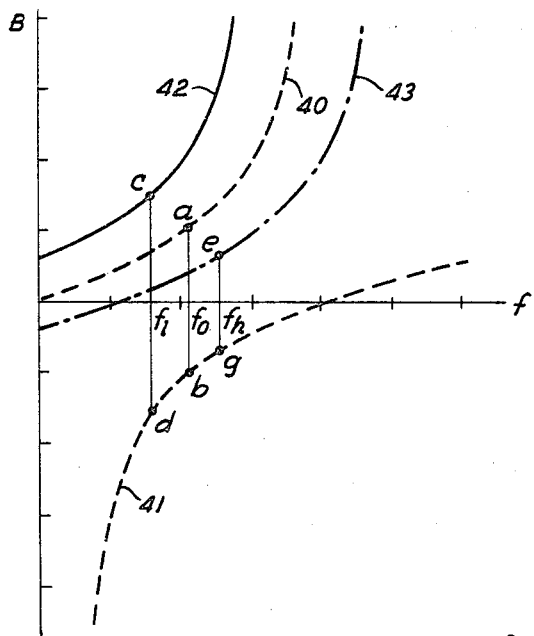
FIG. 4 is a graphical representation of the susceptance versus frequency characteristics of the transmission line stub of FIG. 3.

Referring more specifically to the drawings, FIG. 1 is a schematic representation of the basic embodiment of the present invention in the form of a single-stub filter. A microwave transmission line 10, is shunted intermediate its ends by an open-circuited transmission line stub 11 having a characteristic impedance $Z_{os}$. Stub 11 is, in turn, shunted intermediate its open end and its junction with line 10 by means of a nonlinear reactance device, such as a diode 12, having electrical characteristics to be described in greater detail hereinbelow. Line 10 is terminated at one end by a utilization device represented by the load impedance $Z_L$ shown in FIG. 1. The other end of line 10 can be adapted for connection to the source of electromagnetic energy to be filtered.

As used herein the term "microwave transmission line" is understood to refer to any extended medium for guiding or directing electromagnetic wave energy. Common examples of such media are conductively bounded waveguides, coaxial transmission lines, and strip transmission lines. For the sake of simplicity, however, the present and other embodiments of the present invention are illustrated utilizing two-wire transmission lines.

In the absence of diode 12, the filter of FIG. 1 has a band-suppression characteristic with a center frequency corresponding to that at which the electrical length of stub 11 is one-quarter wavelength, or an odd multiple thereof.

By placing diode 12 in shunt with stub 11, the effective electrical length of the stub, can be increased or decreased, thereby lowering or raising the resonant frequency of the filter.

Diodes suitable for use in the present invention include the so-called P-I-N diode. These diodes are of the diffused junction type having a thin layer of high resistivity or substantially intrinsic semiconducting material sandwiched between adjacent layers of lower resistivity P-type and N-type conductivity materials. The equivalent circuit of such a diode is shown in FIG. 2.

Neglecting resistance, the behavior of diode 12 can be approximated at microwave frequencies by the L-C circuit shown in FIG. 2. Diode 12, by virtue of its parasitic inductance and capacitance, behaves as though it comprised a series inductance L and capacitance C with a switch 13 shunting the capacitance. The diode functions as though switch 13 is closed when it is forward-biased and open when zero- or reverse-biased. Thus, when diode 12 is forward-biased, or in its "on" state, it is equivalent to an inductive reactance at microwave frequencies, whereas when diode 12 is "off" (i.e., is zero-biased or reverse-biased) it is equivalent to an inductive reactance in series with a capacitive reactance. Depending upon the frequency of the microwave energy and upon the characteristics of the diode, the capacitive reactance can be made greater than the inductive reactance so that the net equivalent of a reverse- or zero-biased diode is a capacitive reactance.

In typical P-I-N diodes, the value of parasitic inductance L ranges from 0.5 to 2 nanohenries or more. Typical values of parasitic capacitance C are from 0.3 to 10 picofarads. At a frequency of three kilomegacycles these values represent a range of inductive reactance of approximately 10 to 40 ohms and a range of capacitive reactance of approximately 5 to 150 ohms. By way of example, it is seen that if the inductive reactance is 25 ohms and the capacitive reactance is 50 ohms the diode will have a net inductive reactance of 25 ohms in its forward-biased "on" state and a net capacitive reactance of 25 ohms in its "off" state.

Returning to the operation of the embodiment of FIG. 1, the behavior of diode 12, as it affects the frequency characteristics of the filter, can now be explained. If diode 12 is in its "off" state, it adds a lumped capacitive reactance to stub 11, which is equivalent to increasing the effective electrical length of stub 11, thereby lowering the resonant frequency of the filter. If provision is made for applying a direct-current biasing potential of sufficient magnitude to diode 12, the diode can be switched to its "on" state. By so doing the diode appears as an inductive reactance shunting stub 11, which is equivalent to decreasing the effective electrical length of stub 11, thus raising the resonant frequency of the filter. In general, in order for the diode to be maintained in its forward conducting, or "on" state, a bias potential in excess of a certain minimum value is required. This minimum value is largely fixed by the type of semiconductor used and, in the case of P-I-N diodes, by the width of the intrinsic layer.

Although as mentioned above, P-I-N diodes are utilized in the illustrative embodiments of the present invention, the invention should not be deemed restricted thereby. The primary electrical requirement for the nonlinear reactance device is that it possess at least two separate reactance states which are voltage- or current-dependent. Thus, in some applications it is possible to utilize other nonlinear reactance devices such as varactor diodes in place of the P-I-N diodes described herein.

The biasing means for changing the state of diode 12 can comprise any well-known direct-current source, such as battery 14, for example, together with a switch 15 for interrupting the direct current provided thereby. Appropriate means, not shown, such as a bypass capacitor or other means readily devisable by those skilled in the art, can also be utilized to prevent the microwave energy from being coupled into the biasing circuit.

The degree to which the resonant frequency of the filter of FIG. 1 is shifted, is determined, in the first instance, by the amount of capacitive or inductive reactance offered by diode 12. These values are determined, in turn, by the parasitic inductance and capacitance characterizing the nonlinear conducting device, as explained in connection with the equivalent L-C circuit of FIG. 2. The value of the characteristic impedance $Z_{os}$ of transmission line stub 11 relative to the value of the capacitive and inductive reactances of diode 12 also has a bearing on the degree of shift of the resonant frequency. Thus, if the characteristic impedance $Z_{os}$ of stub 11 is large compared to the inductive or capacitive reactance values of the diode, the diode can appear as a short circuit across the stub. In this case, a padding capacitor can be utilized in series with the diode to "tune-out" the parasitic inductance, thereby allowing the diode to function much as a simple switch shunting the stub.

The point along the length of stub 11 at which the diode is connected is also important in determining the amount of frequency shift. Since the susceptive component of stub 11 is very small near its open end, the susceptance of device 12 will be proportionately large and therefore, if device 12 is connected across stub 11 near that end the change in resonant frequency produced when diode 12 is changed from one state to the other can be very large. On the other hand, if diode 12 is connected across stub 11 near the end where it joins transmission line 10, the shift in resonant frequency due to a change of state of device 12 can be very small.

With a knowledge of the parasitic capacitance and inductance of diode 12 and the characteristic impedance of stub 11, a technician skilled in the art, by utilizing well-known formulas or an impedance chart, can design a filter based on the structure of the embodiment of FIG. 1, the resonance point of which can be switched between two predetermined frequencies.

For example, suppose one wishes to design a band-suppression filter, the resonant frequency of which can be switched between 2.8 and 3.2 kilomegacycles (kmc.). Suppose also that the characteristics of the diode to be utilized are such that at the mean frequency (3.0 kmc.) between the switched frequencies, it offers an inductive reactance of 25 ohms in the "on" state and a net capacitive reactance of 25 ohms in the "off" state. The total length of the stub is approximately 2.5 centimeters, which is equivalent to one-quarter wavelength at 3.0 kmc. Neglecting attenuation and substituting these values, and the value of $Z_{os}$, which is assumed to be 12.5 ohms, into the general network equations for the filter, one obtains the position at which the diode should be placed along the stub. In the illustrative example the diode should be placed across the stub approximately 0.82 cm. from the transmission line. The general network equations referred to can be found in any comprehensive treatise or reference work dealing with transmission lines. (See, for example: Reference Data for Radio Engineers, 4th ed., International Telephone and Telegraph Corporation, New York, 1956, chapter 20, page 549 et seq.).

It is an advantage of the invention that the switching time of this filter is limited only by the inherent switching time of the particular diode utilized and can therefore be on the order of a microsecond or less.

From the above example, it is obvious that the above embodiment can also be used to "characterize" diodes. For example, by placing a diode of unknown characteristics into the filter one can observe the change in its resonant frequency, and then, by reverse analysis, determine the parasitic inductance and capacitance of the diode.

If it is desired to have a filter structure capable of being switched to more than two predetermined frequencies, one can utilize more diodes spaced along the transmission line stub. Since each diode has two states and therefore can switch between two frequencies, the number of discrete resonant frequencies available with such a filter is, in general, equal to $2^n$, where $n$ is the number of diodes. An embodiment illustrating such an application and having other features described hereinafter is shown in FIG. 3.

In FIG. 3 there is shown in schematic diagram an embodiment of the present invention comprising a transmission line 30 terminated with a load impedance $Z_L$ and a tapped transmission line stub 31 shunting the line. The length of stub 31 between its junction with line 30 and its open end is designated $l_1$, and the length of the shorted section is designated $l_2$. The features and advantages of nonadjustable tapped-stub filters are described in detail in applicant's copending application, Ser. No. 246,895, filed Dec. 14, 1962. Across stub 31, in shunt therewith, are a plurality of diodes 32, 33 . . . 34. The dashed line between devices 33 and 34 indicates the possible presence of intervening diodes, the number of which is determined by the number of discrete resonant frequencies desired. As with the embodiment of FIG. 1, the biasing arrangement is shown in its simplified form as comprising a battery 35 together with switches 36, 37 and 38 for selectively applying the biasing voltage provided by battery 35 to diodes 32, 33 and 34 respectively. It is understood that switches 36, 37 and 38 can be actuated manually or electrically either individually or in combination by means well known in the art.

To explain the operation of the embodiment of FIG. 3 it may be helpful to analyze briefly the characteristics of a tapped-stub filter in the absence of diodes 32, 33 . . . 34. By viewing tapped stub 31 as comprised of separate open-circuited and short-circuited studs the analysis is simplified. In practice, the resistive losses of short transmission lines can be neglected, and when this is done the impedance of the open-circuited section of stub 31 is a pure reactance given by:

$$X_{oc} = -Z_{os} \cot \beta l_1 \quad (1)$$

where the phase constant $\beta$ equals $2\pi/\lambda$ or $2\pi f/v$, and $f$ is the frequency, $v$ is the propagation velocity and $\lambda$ the wavelength of the energy within the stub. If viewed from an admittance standpoint the susceptance $B_{oc}$ of the open section of stub 31 as seen from line 30 is given by:

$$B_{oc} = -\frac{1}{Z_{os}} \tan \beta l_1 \quad (2)$$

or $$B_{oc} = -\frac{1}{Z_{os}} \tan \frac{2\pi f l_1}{v} \quad (3)$$

This relation is shown by curve 40 in the graph of FIG. 4 which is a graphical illustration of the susceptance B of the open-circuited and short-circuited sections of stub 31 as seen from line 30 plotted as a function of frequency.

In the same manner the susceptance of the short-circuited section of stub 31 is found to be given by the relation:

$$B_{sc} = -\frac{1}{Z_{os}} \cot \beta l_2 \quad (4)$$

which is shown by curve 41 of the graph of FIG. 4. If the total length of tapped stub 31 is made equal to one-quarter wavelength (i.e., $l_1 + l_2 = \lambda/4$) then Equation 4 can be written:

$$B_{sc} = -\frac{1}{Z_{os}} \cot \beta \left(\frac{\lambda}{4} - l_1\right) \quad (5)$$

$$B_{sc} = -\frac{1}{Z_{os}} \cot \left(\frac{\pi}{2} - \beta l_1\right) \quad (6)$$

but since $\cot (\pi/2 - A) = \tan (A)$, then, $$B_{sc} = -\frac{1}{Z_{os}} \tan \beta l_1 \quad (7)$$

or, $$B_{sc} = -B_{oc} \quad (8)$$

Thus, it is seen that when the total length of stub 31 equals one-quarter wavelength (or an odd multiple thereof) the susceptance of the short-circuited section and the susceptance of the open-circuited section cancel and the stub is at resonance. This resonance point is shown graphically by the equal line segments from $f_0$ connecting point $a$ on curve 40 with point $b$ on curve 41 in the graph of FIG. 4.

As described above, by placing a nonlinear reactance device such as a diode in shunt with an open-circuited transmission line stub, the effective electric length of the stub is varied. If all the diodes 32, 33 . . . 34 spaced along stub 31 are in their "off" state, thereby presenting capacitive susceptances to the stub, then the effective electrical length of stub 31 is increased. The resulting susceptance of the stub is shown graphically by curve 42 of FIG. 4. If, on the other hand, all of the diodes 32, 33 . . . 34 are switched to their "on" state, thereby presenting inductive susceptances to the stub, the resulting susceptance curve is that shown by curve 43. Since the length of the shorted end of tapped stub 31 is not varied, its susceptance curve 41 remains the same as before. Since, at resonance, the susceptance of the shorted section of stub 31 must cancel the susceptance of the open section, it is apparent that when all the diodes are in the "off" state the resonant frequency of the filter is lower. This result is shown by the equal line segments connecting $f_1$ to points $c$ and $d$ on curves 42 and 41 of FIG. 4. Conversely, if all the devices 32, 33 . . . 34 are "on" the resonant frequency of the filter of FIG. 3 is increased, as shown by the equal line segments connecting $f_h$ to points $e$ and $g$ on curves 43 and 41. The lowest resonant frequency of the embodiment of FIG. 3 intersected by line $c$–$d$ is designated $f_1$ and the highest resonant frequency, intersected by line $e$–$g$ is designated $f_h$. The bandpass filter can be adjusted to any one of a plurality of predetermined frequencies between $f_1$ and $f_h$ simply by selectively biasing one or more of diodes 32, 33 . . . 34 in its "on" state. As mentioned above, the number of discrete resonant frequencies is equal to two raised to the power of the number of diodes utilized In FIG. 5 there is shown in schematic diagram another embodiment of the present invention. As before, this embodiment comprises a transmission line 50 shunted by a tapped transmission line stub 51 and terminated by a load impedance $Z_1$. Again a plurality of diodes 52 . . . 53 are connected in shunt with the open-circuited section of stub 51. In addition, another set of diodes 54 . . . 55 is connected across the short-circuited section of stub 51. The dashed lines between devices 52 and 53 and 54 and 55 represent the position of possible intervening diodes. For the sake of simplicity, the biasing means and switches used in selecting the biasing current for the various diodes 52 . . . 53 and 54 . . . 55 have been omitted from FIG. 5.

Figure 6:
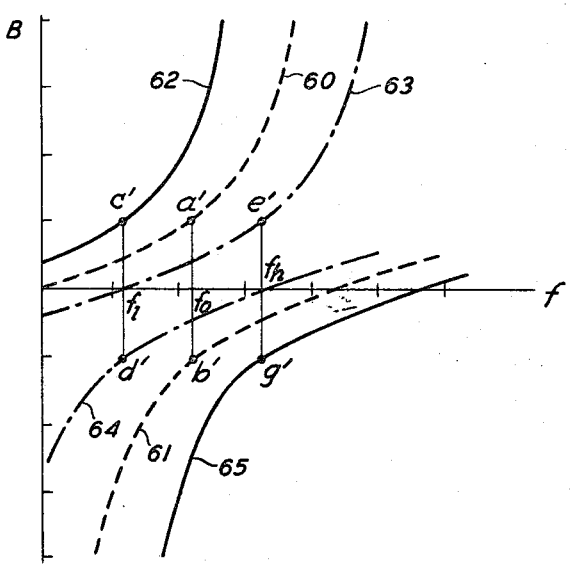
FIG. 6 is a graphical representation of the susceptance versus frequency characteristic of the transmission line stub of FIG. 5.

FIG. 6 is a graphical illustration of the susceptance of the open-circuited and short-circuited sections of tapped stub 51 for various states of diodes 52 . . . 53 and 54 . . . 55. In FIG. 6 curves 60 and 61, respectively, represent the susceptance of the open- and short-circuited sections of stub 51 in the absence of any diodes. Curves 62 and 63 represent the susceptance of the open-circuited end of stub 51 when diodes 52 . . . 53 are all "off" and all "on," respectively. Curves 64 and 65 represent the susceptance of the short-circuited end of stub 51 when diodes 54 . . . 55 are all "on" and all "off," respectively.

Figure 5:
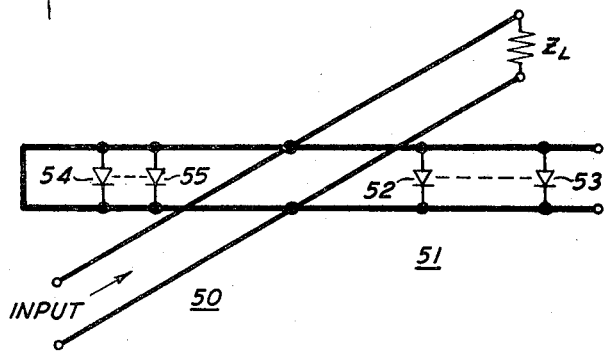
FIG. 5 is a schematic representation of another embodiment of the present invention.

It is apparent that the embodiment of FIG. 5 is identical to that of FIG. 3 except that additional diodes are connected in shunt with the short-circuited section of the tapped stub to allow an additional degree of frequency variation. As before, resonance occurs when the susceptance of the shorted section of stub 51, depicted by curves 61, 64 and 65, is equal and opposite, in sign, to that of the open section of stub 51 shown by curves 60, 62 and 63. Of course, only a few of the many possible resonant frequencies are shown in FIG. 6. These are designated $f_1$, $f_o$ and $f_h$ in keeping with the nomenclature adopted in connection with the graph of FIG. 4.

A feature of the embodiment of FIG. 5 not present in that of FIG. 3 allows a substantially identical bandwidth to be realized at each resonant frequency. With the aid of the susceptance-versus-frequency graph of FIG. 6 this feature can be understood. First, it can be shown that the bandwidth of a tapped-stub filter such as that of FIG. 5 is proportional to the slope of the total susceptance-versus-frequency curve of the stub. That is, the bandwidth of the filter is proportional the derivative of ($B_{oc}-B_{sc}$) with respect to frequency. From FIG. 6, it is seen that the slope of curves 60, 61, 62, 64, 63 and 65 are substantially equal at points $a'$ through $g'$, respectively. The banndwidth of the filter at the frequencies $f_1$, $f_o$ and $f_h$ are therefore substantially equal. A similar observation of the graph of FIG. 4 discloses that the slopes are substantially different at each point. Thus, by utilizing diodes in the shorted section as well as the open section of the tapped transmission line stub, it is possible to obtain either the same or, if desired, different filter bandwidths over the frequency range of operation.

In this, as well as the other illustrative embodiments the bandwidth of the filter is also influenced by the ratio of the line impedance-to-stub impedance. In general, the bandwidth of the filter is increased as the characteristic impedance of the stub is increased relative to that of the line. Conversely, the filter bandwidth is narrowed by decreasing the ratio of stub-to-line characteristic impedances.

In FIG. 7 there is shown in a partially broken away pictorial view another embodiment of the present invention utilizing coaxial transmission line elements. In this embodiment a main section of coaxial transmission line 70 is shunted at a region along its length by a coaxial transmission line stub 71. Extending between inner conductor 72 and outer conductor 73 of stub 71 are diodes 74 and 75. In this embodiment both diodes 74 and 75 are connected across stub 71 at the same transverse cross section.

One electrode of each of the diodes 74 and 75 is electrically connected to center conductor 72. The other electrode of each diode is connected to leads 76 and 77, respectively. Leads 76 and 77 pass through outer conductor 73 by means of feed-through capacitors 78 and 79, respectively. These capacitors provide a low impedance path for microwave energy and thus prevent its loss from stub 71 while allowing the direct-current biasing current to pass through outer conductor 73 to the diodes.

Leads 76 and 77 are connected to sources of direct-current biasing potential through selective switching means. By way of example, in the embodiment of FIG. 7 the biasing sources are shown as batteries 80 and 81 connected through switches 82 and 83 to leads 76 and 77, respectively. It is obvious, of course, that a single biasing source can be utilized in place of the two shown as long as means are provided for selectively applying the biasing current to each of the diodes. The biasing current return path can be conveniently made by means of center conductor 72 of stub 71 by the use of additional feed-through capacitors or by any similar means well known in the art.

It is recognized that as in the other embodiments stub 71 can be open-circuited or short-circuited depending upon the filter characteristics desired. Furthermore, this embodiment can be modified by providing a greater or lesser number of diodes shunted across stub 71, either at the same transverse cross section or at different regions along its length as illustrated in the previous embodiments.

Another embodiment of the present invention utilizing strip transmission line components is shown in the exploded pictorial view of FIG. 8. In this embodiment a dual tapped stub filter similar to that of the embodiment of FIG. 3 is shown. A thin ribbon-like strip of conductive material 84 serves as the center conductor of the main transmission line. A pair of ribbon-like stubs 85 and 86 are shunted across strip 84 and spaced apart a distance substantially equal to a quarter-wavelength, or an odd multiple thereof, at the midband of the filter. Strip 84 and stubs 85 and 86 are sandwiched between conductive ground planes 87 and 88 and electrically insulated therefrom by dielectric sheets 89 and 90, respectively. When assembled, dielectric insulating sheets 89 and 90 are bolted or otherwise clamped together by means well known in the art so that the over-all structure is substantially unitary.

Conductive rivets 91 extend from one end of stubs 85 and 86 through dielectric sheet 89 to conductive ground plane 87. A similar set of rivets 92 extend through dielectric sheet 90 to contact conductive ground plane 88. Thus, rivets 91 and 92 serve to short circuit one end of each stub as in the other tapped stub embodiments.

A plurality of diodes 93 are connected between stubs 85 and 86 and ground plane 88. Bypass capacitors 94 provide a high frequency path through the nonlinear conducting devices to ground plane 88 while insulating them for direct-current biasing purposes. For the sake of simplicity, the biasing means and switching arrangement for selectively applying the biasing current to each of the nonlinear conducting devices have been omitted from FIG. 8.

It is noted that in the embodiment of FIG. 8, diodes 93 are disposed between stubs 85 and 86 and ground plane 88. If it is desired to fabricate a strip transmission line filter in which the diode mounting is balanced, appropriate modifications can be made. The copending application of M. V. Schneider, Ser. No. 281,270, filed May 17, 1963, discloses such an arrangement. By utilizing the teachings of the Schneider application, diodes 93 can be connected between stubs 85 and 86 and both ground planes 87 and 88.

The embodiment of FIG. 8 can be further modified by shunting one or more diodes along strip 84 between stubs 85 and 86. These auxiliary diodes can then be switched in conjunction with diodes 93 in order to vary the effective electrical length of strip 84 between the two stubs. In some cases such modification may be advantageous in order to insure the effective quarter-wavelength spacing between the stubs, especially where it is desired to switch between widely separated resonant frequencies.

Although certain specific embodiments of the invention have been shown in the drawings and described in the foregoing specification, it is understood that the invention is not limited to those specific embodiments, but is capable of modification by those skilled in the art without departing from the spirit and scope of the present invention.

What is claimed is:

1. A tunable microwave filter comprising, in combination:
   a microwave transmission line,
   a tapped transmission line stub connected in shunt with said transmission line,
   said stub having an open-circuited and short-circuited section, the connection between said transmission line and said stub being intermediate said sections,
   a plurality of nonlinear reactance devices connected in shunt with at least one of said sections, and
   means for selectively biasing each of said nonlinear reactance devices.

2. The filter according to claim 1 wherein each of said nonlinear reactance devices comprises a P-I-N diode.

3. In an electromagnetic wave transmission system including a signal source, a load, and a transmsission line connecting said source to said load, a tunable filter comprising:
   a transmission line stub connected in shunt across said transmission line at a point between said source and said load;

sion line stub. Since each diode has two states and therefore can switch between two frequencies, the number of discrete resonant frequencies available with such a filter is, in general, equal to $2^n$, where $n$ is the number of diodes. An embodiment illustrating such an application and having other features described hereinafter is shown in FIG. 3.

In FIG. 3 there is shown in schematic diagram an embodiment of the present invention comprising a transmission line 30 terminated with a load impedance $Z_L$ and a tapped transmission line stub 31 shunting the line. The length of stub 31 between its junction with line 30 and its open end is designated $l_1$, and the length of the shorted section is designated $l_2$. The features and advantages of nonadjustable tapped-stub filters are described in detail in applicant's copending application, Ser. No. 246,895, filed Dec. 14, 1962. Across stub 31, in shunt therewith, are a plurality of diodes 32, 33 . . . 34. The dashed line between devices 33 and 34 indicates the possible presence of intervening diodes, the number of which is determined by the number of discrete resonant frequencies desired. As with the embodiment of FIG. 1, the biasing arrangement is shown in its simplified form as comprising a battery 35 together with switches 36, 37 and 38 for selectively applying the biasing voltage provided by battery 35 to diodes 32, 33 and 34 respectively. It is understood that switches 36, 37 and 38 can be actuated manually or electrically either individually or in combination by means well known in the art.

To explain the operation of the embodiment of FIG. 3 it may be helpful to analyze briefly the characteristics of a tapped-stub filter in the absence of diodes 32, 33 . . . 34. By viewing tapped stub 31 as comprised of separate open-circuited and short-circuited studs the analysis is simplified. In practice, the resistive losses of short transmission lines can be neglected, and when this is done the impedance of the open-circuited section of stub 31 is a pure reactance given by:

$$X_{oc} = -Z_{os} \cot \beta l_1 \qquad (1)$$

where the phase constant $\beta$ equals $2\pi/\lambda$ or $2\pi f/v$, and $f$ is the frequency, $v$ is the propagation velocity and $\lambda$ the wavelength of the energy within the stub. If viewed from an admittance standpoint the susceptance $B_{oc}$ of the open section of stub 31 as seen from line 30 is given by:

$$B_{oc} = -\frac{1}{Z_{os}} \tan \beta l_1 \qquad (2)$$

or $$B_{oc} = \frac{1}{Z_{os}} \tan \frac{2\pi f l_1}{v} \qquad (3)$$

This relation is shown by curve 40 in the graph of FIG. 4 which is a graphical illustration of the susceptance B of the open-circuited and short-circuited sections of stub 31 as seen from line 30 plotted as a function of frequency.

In the same manner the susceptance of the short-circuited section of stub 31 is found to be given by the relation:

$$B_{sc} = -\frac{1}{Z_{os}} \cot \beta l_2 \qquad (4)$$

which is shown by curve 41 of the graph of FIG. 4. If the total length of tapped stub 31 is made equal to one-quarter wavelength (i.e., $l_1 + l_2 = \lambda/4$) then Equation 4 can be written:

$$B_{sc} = -\frac{1}{Z_{os}} \cot \beta \left(\frac{\lambda}{4} - l_1\right) \qquad (5)$$

$$B_{sc} = -\frac{1}{Z_{os}} \cot \left(\frac{\pi}{2} - \beta l_1\right) \qquad (6)$$

but since $\cot(\pi/2 - A) = \tan(A)$, then, $$B_{sc} = -\frac{1}{Z_{os}} \tan \beta l_1 \qquad (7)$$

or, $$B_{sc} = -B_{oc} \qquad (8)$$

Thus, it is seen that when the total length of stub 31 equals one-quarter wavelength (or an odd multiple thereof) the susceptance of the short-circuited section and the susceptance of the open-circuited section cancel and the stub is at resonance. This resonance point is shown graphically by the equal line segments from $f_0$ connecting point $a$ on curve 40 with point $b$ on curve 41 in the graph of FIG. 4.

As described above, by placing a nonlinear reactance device such as a diode in shunt with an open-circuited transmission line stub, the effective electric length of the stub is varied. If all the diodes 32, 33 . . . 34 spaced along stub 31 are in their "off" state, thereby presenting capacitive susceptances to the stub, then the effective electrical length of stub 31 is increased. The resulting susceptance of the stub is shown graphically by curve 42 of FIG. 4. If, on the other hand, all of the diodes 32, 33 . . . 34 are switched to their "on" state, thereby presenting inductive susceptances to the stub, the resulting susceptance curve is that shown by curve 43. Since the length of the shorted end of tapped stub 31 is not varied, its susceptance curve 41 remains the same as before. Since, at resonance, the susceptance of the shorted section of stub 31 must cancel the susceptance of the open section, it is apparent that when all the diodes are in the "off" state the resonant frequency of the filter is lower. This result is shown by the equal line segments connecting $f_1$ to points $c$ and $d$ on curves 42 and 41 of FIG. 4. Conversely, if all the devices 32, 33 . . . 34 are "on" the resonant frequency of the filter of FIG. 3 is increased, as shown by the equal line segments connecting $f_h$ to points $e$ and $g$ on curves 43 and 41. The lowest resonant frequency of the embodiment of FIG. 3 intersected by line $c$–$d$ is designated $f_1$ and the highest resonant frequency, intersected by line $e$–$g$ is designated $f_h$. The bandpass filter can be adjusted to any one of a plurality of predetermined frequencies between $f_1$ and $f_h$ simply by selectively biasing one or more of diodes 32, 33 . . . 34 in its "on" state. As mentioned above, the number of discrete resonant frequencies is equal to two raised to the power of the number of diodes utilized.

In FIG. 5 there is shown in schematic diagram another embodiment of the present invention. As before, this embodiment comprises a transmission line 50 shunted by a tapped transmission line stub 51 and terminated by a load impedance $Z_1$. Again a plurality of diodes 52 . . . 53 are connected in shunt with the open-circuited section of stub 51. In addition, another set of diodes 54 . . . 55 is connected across the short-circuited section of stub 51. The dashed lines between devices 52 and 53 and 54 and 55 represent the position of possible intervening diodes. For the sake of simplicity, the biasing means and switches used in selecting the biasing current for the various diodes 52 . . . 53 and 54 . . . 55 have been omitted from FIG. 5.

FIG. 6 is a graphical illustration of the susceptance of the open-circuited and short-circuited sections of tapped stub 51 for various states of diodes 52 . . . 53 and 54 . . . 55. In FIG. 6 curves 60 and 61, respectivelly, represent the susceptance of the open- and short-circuited sections of stub 51 in the absence of any diodes. Curves 62 and 63 represent the susceptance of the open-circuited end of stub 51 when diodes 52 . . . 53 are all "off" and all "on," respectively. Curves 64 and 65 represent the susceptance of the short-circuited end of stub 51 when diodes 54 . . . 55 are all "on" and all "off," respectively.

It is apparent that the embodiment of FIG. 5 is identical to that of FIG. 3 except that additional diodes are connected in shunt with the short-circuited section of the tapped stub to allow an additional degree of frequency variation. As before, resonance occurs when the susceptance of the shorted section of stub 51, depicted by curves 61, 64 and 65, is equal and opposite, in sign, to that of the open section of stub 51 shown by curves 60, 62 and 63. Of course, only a few of the many possible resonant frequencies are shown in FIG. 6. These are designated $f_1$, $f_0$ and $f_h$ in keeping with the nomenclature adopted in connection with the graph of FIG. 4.

A feature of the embodiment of FIG. 5 not present in that of FIG. 3 allows a substantially identical bandwidth to be realized at each resonant frequency. With the aid of the susceptance-versus-frequency graph of FIG. 6 this feature can be understood. First, it can be shown that the bandwidth of a tapped-stub filter such as that of FIG. 5 is proportional to the slope of the total susceptance-versus-frequency curve of the stub. That is, the bandwidth of the filter is proportional the derivative of $(B_{oc}-B_{sc})$ with respect to frequency. From FIG. 6, it is seen that the slope of curves 60, 61, 62, 64, 63 and 65 are substantially equal at points $a'$ through $g'$, respectively. The banndwidth of the filter at the frequencies $f_1$, $f_0$ and $f_h$ are therefore substantially equal. A similar observation of the graph of FIG. 4 discloses that the slopes are substantially different at each point. Thus, by utilizing diodes in the shorted section as well as the open section of the tapped transmission line stub, it is possible to obtain either the same or, if desired, different filter bandwidths over the frequency range of operation.

In this, as well as the other illustrative embodiments the bandwidth of the filter is also influenced by the ratio of the line impedance-to-stub impedance. In general, the bandwidth of the filter is increased as the characteristic impedance of the stub is increased relative to that of the line. Conversely, the filter bandwidth is narrowed by decreasing the ratio of stub-to-line characteristic impedances.

In FIG. 7 there is shown in a partially broken away pictorial view another embodiment of the present invention utilizing coaxial transmission line elements. In this embodiment a main section of coaxial transmission line 70 is shunted at a region along its length by a coaxial transmission line stub 71. Extending between inner conductor 72 and outer conductor 73 of stub 71 are diodes 74 and 75. In this embodiment both diodes 74 and 75 are connected across stub 71 at the same transverse cross section.

One electrode of each of the diodes 74 and 75 is electrically connected to center conductor 72. The other electrode of each diode is connected to leads 76 and 77, respectively. Leads 76 and 77 pass through outer conductor 73 by means of feed-through capacitors 78 and 79, respectively. These capacitors provide a low impedance path for microwave energy and thus prevent its loss from stub 71 while allowing the direct-current biasing current to pass through outer conductor 73 to the diodes.

Leads 76 and 77 are connected to sources of direct-current biasing potential through selective switching means. By way of example, in the embodiment of FIG. 7 the biasing sources are shown as batteries 80 and 81 connected through switches 82 and 83 to leads 76 and 77, respectively. It is obvious, of course, that a single biasing source can be utilized in place of the two shown as long as means are provided for selectively applying the biasing current to each of the diodes. The biasing current return path can be conveniently made by means of center conductor 72 of stub 71 by the use of additional feed-through capacitors or by any similar means well known in the art.

It is recognized that as in the other embodiments stub 71 can be open-circuited or short-circuited depending upon the filter characteristics desired. Furthermore, this embodiment can be modified by providing a greater or lesser number of diodes shunted across stub 71, either at the same transverse cross section or at different regions along its length as illustrated in the previous embodiments.

Another embodiment of the present invention utilizing strip transmission line components is shown in the exploded pictorial view of FIG. 8. In this embodiment a dual tapped stub filter similar to that of the embodiment of FIG. 3 is shown. A thin ribbon-like strip of conductive material 84 serves as the center conductor of the main transmission line. A pair of ribbon-like stubs 85 and 86 are shunted across strip 84 and spaced apart a distance substantially equal to a quarter-wavelength, or an odd multiple thereof, at the midband of the filter. Strip 84 and stubs 85 and 86 are sandwiched between conductive ground planes 87 and 88 and electrically insulated therefrom by dielectric sheets 89 and 90, respectively. When assembled, dielectric insulating sheets 89 and 90 are bolted or otherwise clamped together by means well known in the art so that the over-all structure is substantially unitary.

Conductive rivets 91 extend from one end of stubs 85 and 86 through dielectric sheet 89 to conductive ground plane 87. A similar set of rivets 92 extend through dielectric sheet 90 to contact conductive ground plane 88. Thus, rivets 91 and 92 serve to short circuit one end of each stub as in the other tapped stub embodiments.

A plurality of diodes 93 are connected between stubs 85 and 86 and ground plane 88. Bypass capacitors 94 provide a high frequency path through the nonlinear conducting devices to ground plane 88 while insulating them for direct-current biasing purposes. For the sake of simplicity, the biasing means and switching arrangement for selectively applying the biasing current to each of the nonlinear conducting devices have been omitted from FIG. 8.

It is noted that in the embodiment of FIG. 8, diodes 93 are disposed between stubs 85 and 86 and ground plane 88. If it is desired to fabricate a strip transmission line filter in which the diode mounting is balanced, appropriate modifications can be made. The copending application of M. V. Schneider, Ser. No. 281,270, filed May 17, 1963, discloses such an arrangement. By utilizing the teachings of the Schneider application, diodes 93 can be connected between stubs 85 and 86 and both ground planes 87 and 88.

The embodiment of FIG. 8 can be further modified by shunting one or more diodes along strip 84 between stubs 85 and 86. These auxiliary diodes can then be switched in conjunction with diodes 93 in order to vary the effective electrical length of strip 84 between the two stubs. In some cases such modification may be advantageous in order to insure the effective quarter-wavelength spacing between the stubs, especially where it is desired to switch between widely separated resonant frequencies.

Although certain specific embodiments of the invention have been shown in the drawings and described in the foregoing specification, it is understood that the invention is not limited to those specific embodiments, but is capable of modification by those skilled in the art without departing from the spirit and scope of the present invention.

What is claimed is:

1. A tunable microwave filter comprising, in combination:
   a microwave transmission line,
   a tapped transmission line stub connected in shunt with said transmission line,
   said stub having an open-circuited and short-circuited section, the connection between said transmission line and said stub being intermediate said sections,
   a plurality of nonlinear reactance devices connected in shunt with at least one of said sections, and
   means for selectively biasing each of said nonlinear reactance devices.

2. The filter according to claim 1 wherein each of said nonlinear reactance devices comprises a P-I-N diode.

3. In an electromagnetic wave transmission system including a signal source, a load, and a transmission line connecting said source to said load, a tunable filter comprising:
   a transmission line stub connected in shunt across said transmission line at a point between said source and said load;

a plurality of diodes connected in shunt across said transmission line stub, each diode having a pair of different reactance states which are voltage dependent; and means for establishing the reactance state of each diode to achieve a desired filter characteristic.

4. The filter according to claim 1 wherein said transmission line and said transmission line stub are coaxial cables.

5. The filter according to claim 1 wherein said transmission line and said transmission line stub are strip transmission lines.

References Cited

UNITED STATES PATENTS

| 3,164,792 | 1/1965 | Georgiev | 333—73 |
| 3,215,955 | 11/1965 | Thomas et al. | 333—7 |
| 3,080,530 | 3/1963 | Smith | 330—61 |
| 3,108,239 | 10/1963 | Koneiter | 333—83 |
| 3,235,820 | 2/1966 | Munushian | 333—31 |
| 3,195,071 | 7/1965 | Steinhoff | 331—107 |
| 3,179,816 | 4/1965 | Hall | 333—7 |
| 3,328,670 | 6/1967 | Parker | 321—69 |
| 3,343,069 | 9/1967 | Tsuda | 321—69 |
| 3,316,553 | 4/1967 | Blass | 343—854 |

HERMAN KARL SAALBACH, *Primary Examiner.*

C. BARAFF, *Assistant Examiner.*

U.S. Cl. X.R.

334—15